(12) United States Patent  (10) Patent No.: US 8,903,805 B2
Lee et al.  (45) Date of Patent: Dec. 2, 2014

(54) METHOD AND SYSTEM FOR PERFORMING QUERY OPTIMIZATION USING A HYBRID EXECUTION PLAN

(75) Inventors: Allison Lee, San Carlos, CA (US); Mohamed Zait, San Jose, CA (US); Yali Zhu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 146 days.

(21) Appl. No.: 12/860,294

(22) Filed: Aug. 20, 2010

(65) Prior Publication Data

US 2012/0047158 A1  Feb. 23, 2012

(51) Int. Cl.
*G06F 17/30* (2006.01)

(52) U.S. Cl.
CPC ............................. *G06F 17/30469* (2013.01)
USPC .......................................... 707/718; 707/759

(58) Field of Classification Search
USPC ................... 707/759, 718, 999.005
See application file for complete search history.

(56) References Cited

U.S. PATENT DOCUMENTS

| | | | |
|---|---|---|---|
| 5,742,806 A * | 4/1998 | Reiner et al. | 1/1 |
| 5,848,408 A | 12/1998 | Jakobsson et al. | |
| 5,864,840 A * | 1/1999 | Leung et al. | 1/1 |
| 5,963,932 A | 10/1999 | Jakobsson et al. | |
| 6,609,131 B1 | 8/2003 | Zait et al. | |
| 6,665,684 B2 | 12/2003 | Zait et al. | |
| 6,931,390 B1 | 8/2005 | Zait et al. | |
| 6,957,225 B1 | 10/2005 | Zait et al. | |
| 6,965,891 B1 | 11/2005 | Jakobsson et al. | |
| 7,020,661 B1 | 3/2006 | Cruanes et al. | |
| 7,409,517 B2 | 8/2008 | Dageville et al. | |
| 7,447,676 B2 | 11/2008 | Zait et al. | |
| 7,499,960 B2 | 3/2009 | Dageville et al. | |
| 7,539,608 B1 | 5/2009 | Dageville et al. | |
| 7,603,339 B2 | 10/2009 | Cruanes et al. | |
| 7,634,456 B2 | 12/2009 | Yagoub et al. | |
| 7,636,731 B2 | 12/2009 | Cruanes et al. | |
| 7,644,062 B2 | 1/2010 | Su et al. | |
| 7,664,730 B2 | 2/2010 | Ziauddin et al. | |
| 7,680,761 B2 | 3/2010 | Zait et al. | |
| 7,689,550 B2 | 3/2010 | Lee et al. | |
| 7,702,623 B2 | 4/2010 | Lee et al. | |
| 7,702,627 B2 | 4/2010 | Ahmed et al. | |
| 7,739,263 B2 | 6/2010 | Das et al. | |
| 7,747,606 B2 | 6/2010 | Dageville et al. | |
| 7,779,008 B2 | 8/2010 | Dageville et al. | |
| 7,805,411 B2 | 9/2010 | Ziauddin et al. | |
| 7,809,713 B2 | 10/2010 | Su et al. | |
| 7,877,373 B2 | 1/2011 | Zait | |
| 7,877,379 B2 | 1/2011 | Waingold et al. | |
| 7,945,562 B2 | 5/2011 | Ahmed et al. | |
| 2004/0210563 A1 | 10/2004 | Zait et al. | |
| 2004/0236762 A1 * | 11/2004 | Chaudhuri et al. | 707/100 |
| 2005/0038784 A1 | 2/2005 | Zait et al. | |
| 2005/0119999 A1 | 6/2005 | Zait et al. | |
| 2005/0120000 A1 | 6/2005 | Ziauddin et al. | |

(Continued)

*Primary Examiner* — Alexy Shmatov
(74) *Attorney, Agent, or Firm* — Vista IP Law Group, LLP

(57) ABSTRACT

An improved method, system, and computer program product is disclosed that provides a hybrid approach to optimization which allows different subsets of data accessed by a query to be optimized with different access paths and execution approaches. Transformations may be performed to re-write the query, which restructures the query in a way that facilitates the hybrid optimization process. Multiple transformations may be interleaved to produce an efficient re-written query.

43 Claims, 15 Drawing Sheets

(56) References Cited

U.S. PATENT DOCUMENTS

| | | |
|---|---|---|
| 2005/0120001 A1 | 6/2005 | Yagoub et al. |
| 2005/0125398 A1 | 6/2005 | Das et al. |
| 2005/0125427 A1 | 6/2005 | Dageville et al. |
| 2005/0125452 A1 | 6/2005 | Ziauddin et al. |
| 2005/0138015 A1 | 6/2005 | Dageville et al. |
| 2005/0177557 A1 | 8/2005 | Ziauddin et al. |
| 2005/0283471 A1 | 12/2005 | Ahmed |
| 2006/0218123 A1* | 9/2006 | Chowdhuri et al. ............. 707/2 |
| 2006/0271504 A1* | 11/2006 | Anderson et al. ................ 707/2 |
| 2007/0078812 A1 | 4/2007 | Waingold et al. |
| 2007/0179947 A1 | 8/2007 | Ahmed et al. |
| 2007/0219951 A1 | 9/2007 | Ahmed et al. |
| 2007/0219969 A1 | 9/2007 | Su et al. |
| 2007/0219977 A1 | 9/2007 | Su et al. |
| 2008/0120274 A1 | 5/2008 | Cruanes et al. |
| 2008/0120275 A1 | 5/2008 | Cruanes et al. |
| 2008/0201296 A1* | 8/2008 | Yu et al. .......................... 707/2 |
| 2009/0037404 A1 | 2/2009 | Lee et al. |
| 2009/0037405 A1 | 2/2009 | Lee et al. |
| 2009/0259644 A1* | 10/2009 | Scheuermann .................. 707/4 |
| 2010/0030728 A1 | 2/2010 | Chakkappen et al. |
| 2011/0099160 A1* | 4/2011 | Birdsall et al. ................ 707/716 |
| 2012/0047158 A1 | 2/2012 | Lee et al. |

\* cited by examiner

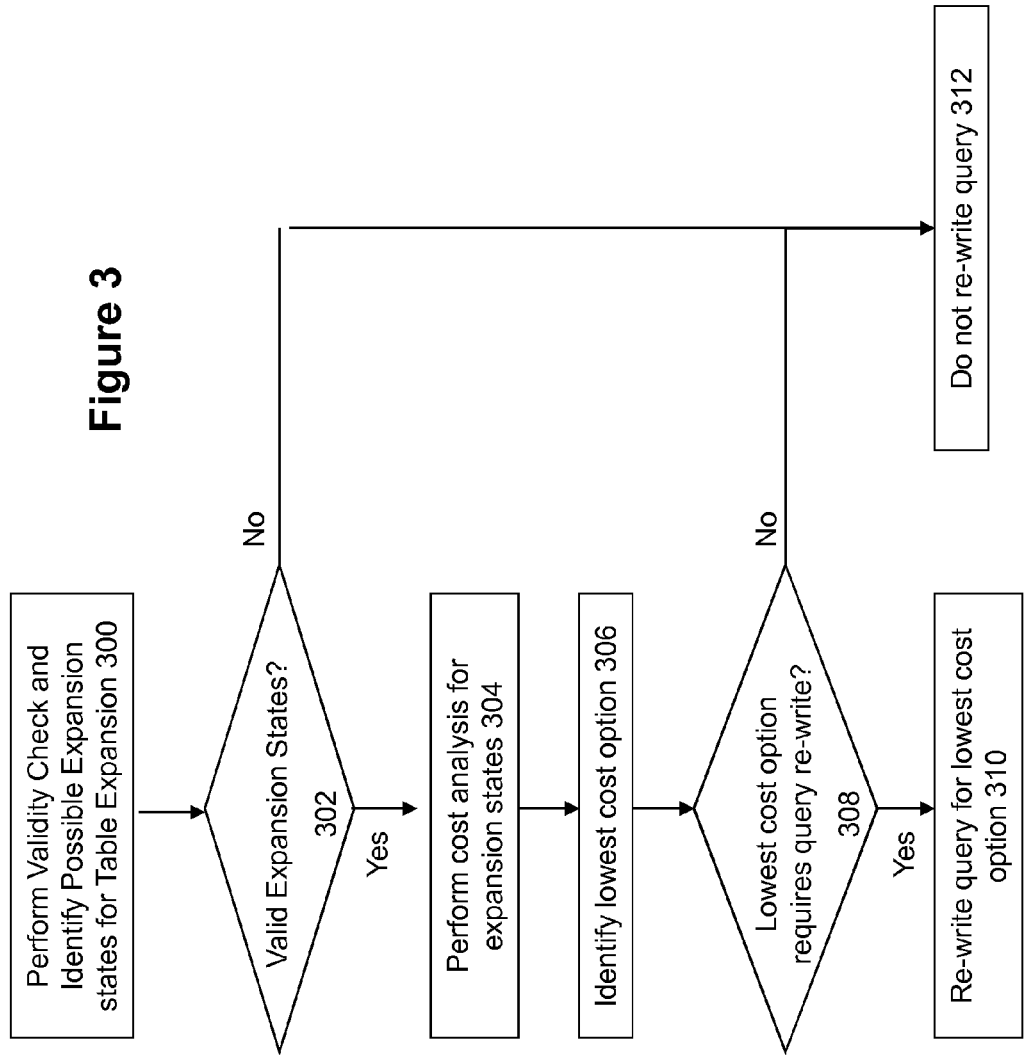

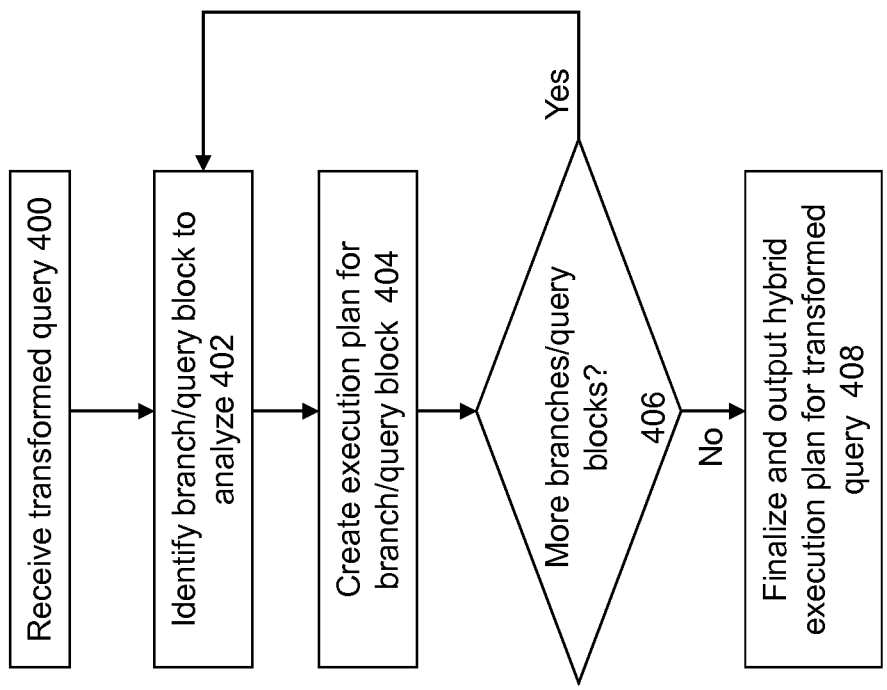

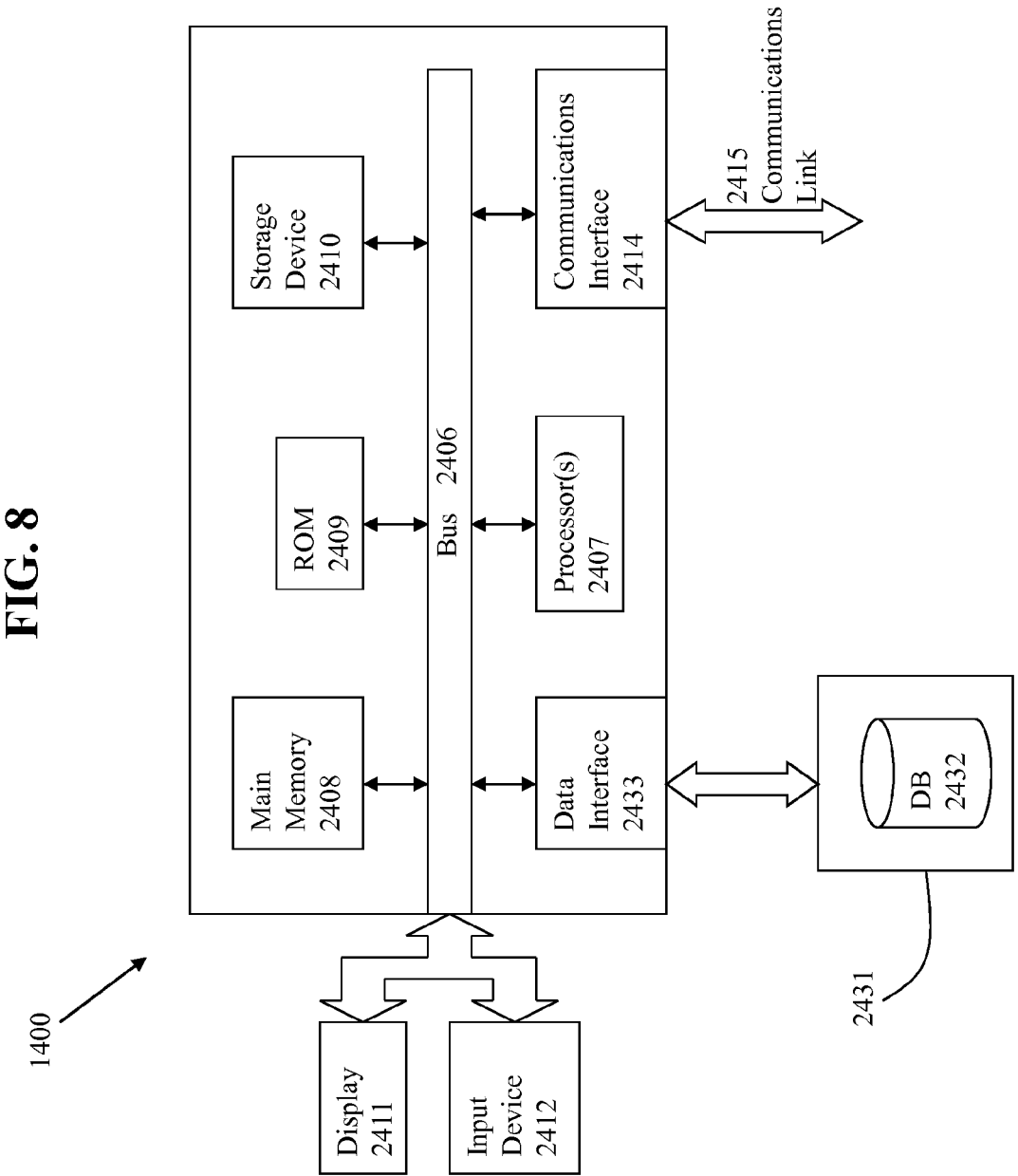

METHOD AND SYSTEM FOR PERFORMING QUERY OPTIMIZATION USING A HYBRID EXECUTION PLAN

FIELD

The invention relates to the field of data management and query processing.

BACKGROUND AND SUMMARY

A "query" is a statement or collection of statements that is used to access a database. Specialized query languages, such as the structured query language ("SQL") are often used to interrogate and access a database. The query will contain the identity of the database object(s) being accessed to execute the query (e.g., one or more named database tables). If the query accesses two or more database objects, the query also specifies the link between the objects (e.g., a join condition or column). The typical query also defines selection criteria, which is often referred to as a matching condition, filter, or predicate. A query may define which fields in the database object are to be displayed or printed in the result. For purpose of illustration, this document will be explained with reference to SQL statements and relational database structures such as tables and rows. It is noted, however, that the inventive concepts disclosed herein are applicable to other types of languages, objects, structures, and operations in a database.

Optimization is the process of choosing an efficient way to execute a query. Many different ways are often available to execute a query, e.g., by varying the order or procedure in which database objects are accessed to execute the query. The exact execution plan or access path that is employed to execute the query can greatly affect how quickly or efficiently the query statement executes.

For example, consider a very large database table that is used to store every sales record for a company. If an index does not exist for the table, then a query on the table will necessarily need to perform a scan operation to scan each row of the table to execute the query. However, if an index exists for the table that is relevant to a given query, then it is possible that using the index will result in a more efficient way to specifically identify and access the relevant rows of the table that are needed to execute the query, especially if the selectivity of the query predicate lends itself to an index-based approach to optimize the query execution plan.

Conventional optimizers take a "one size fits all" approach to determine the appropriate access path for a query. In other words, for a table that is accessed by a query, the optimizer will determine a selected access path for the table, e.g., the execution plan for the query will use either an index or a sequential scan (also referred to as a table scan) to execute the query for the entire table.

The problem is that a first portion of the table being queried may actually be more efficiently queried using an access path that is different from the access path that would be efficient for a second portion of the same table. For example, consider a large database table that has been partitioned, where the contents of that large table has been decomposed into a number of smaller and more manageable portions or "partitions." Assume that a first partition of the table is associated with an index but a second partition is not associated with an index, and further assume that a given query would be more efficiently executed against the first partition if the index is used as the access path in the execution plan. However, since the second partition does not correspond to an index, the "one size fits all" approach of conventional optimizers would necessarily select the sequential scan approach to execute the entirety of query, including the querying of the first partition (which is indexed).

The present invention provides an improved method, system, and computer program product that is suitable to address these issues with the conventional approaches. According to some embodiments, a hybrid approach is provided that allows different subsets of data accessed by a query to be optimized with different optimizer decisions, execution plans, and/or execution approaches. For example, embodiments of the present invention can be used to optimize a first subset of data with a different access path, join order, or join method than is used to optimize a second subset of data. Transformations may be performed to re-write the query, which restructures the query in a way that facilitates the hybrid optimization process. Multiple transformations may be interleaved to produce an efficient re-written query.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 3 shows a flowchart of an approach for performing a table expansion transformation to optimize a query according to some embodiments of the invention.

FIG. 4 shows a flowchart of an approach for optimizing a query according to some embodiments of the invention.

FIG. 8 depicts a computerized system on which a method for re-using digital assertions in a mixed signal context can be implemented.

DETAILED DESCRIPTION

Figure 1:
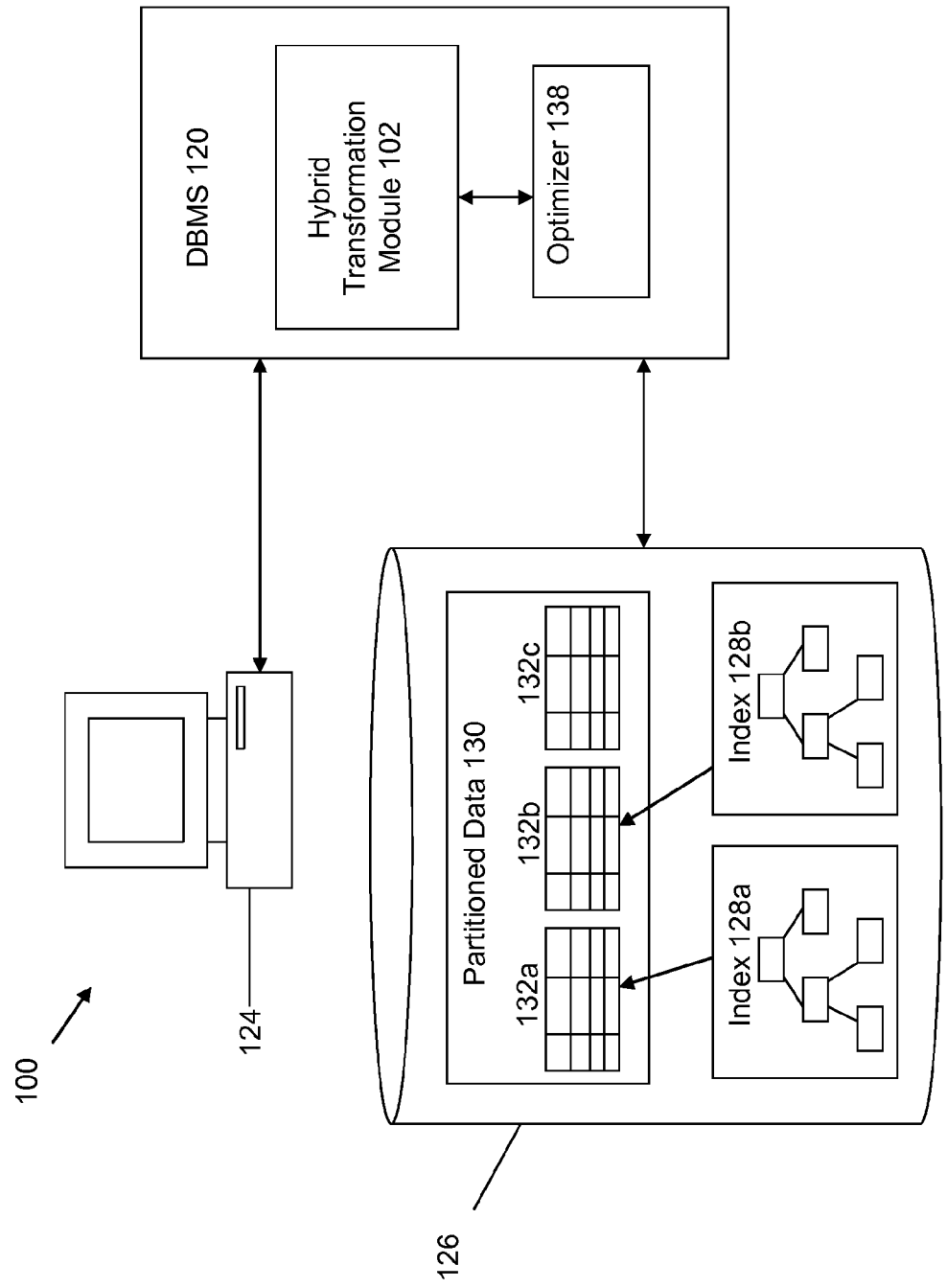
FIG. 1 illustrates an example system for performing hybrid query optimization according to some embodiments of the invention.

The present invention provides an improved method, system, and computer program product that is suitable to address these issues with the conventional approaches. According to some embodiments, a hybrid approach is provided that allows different subsets of data accessed by a query to be optimized with different optimizer decisions, execution plans, and/or execution approaches. For example, embodiments of the present invention can be used to optimize a first subset of data with a different access path, join order, or join method than is used to optimize a second subset of data. For the purposes of illustration, the following description will explain the invention with reference to specific examples where the "subsets of data" are in the form of database partitions, and where the specific examples of optimizer decisions relate to selection of access paths that are either index-based access paths or sequential scan access paths. It is noted, however, the invention is not limited in its application to database partitions, these specific optimizer decisions, and the example access paths, and indeed may be applicable to any form of data subsets and optimizer decisions As an example of a partitioned table, consider the example table "Sales" shown in FIG. 5A. The Sales table includes three columns, the "Customer_ID" column, "Amount_Sold" column, and a "Year" column. Assume that it is desired to partition the Sales table into multiple partitions 530 based upon the value in the Year column. The partitioning may be implemented by creating a different partition for each year represented in the Sales table. Therefore, a partition 530a can be created and used to store all rows in the Sales table having the value "2008" in the Year column. Similarly, a partition 530b can be created and used to store all rows having the value "2009" in the Year column and a partition 530c can be created and used to store all rows having the value "2010" in the Year column.

Indices 528 may also be created to index values in the Sales table, where a separate index is created for each partition. It is possible, however, that an index is created for only some, but not all, of the partitions, such as shown in the figure where an index 528a is created that corresponds to partition 530a, an index 528b is created that corresponds to partition 530b, but no index has been created for partition 530c. One reason for indexing only some of the partitions is because index creation and maintenance requires a significant amount of overhead. Creating indexes leads to more space utilization in the database to store the index and additional maintenance overhead is required for operations such as INSERT, UPDATE and DELETE. For tables which are subject to high transaction volume, the cost of maintaining indexes can be prohibitive.

In many cases, ongoing transactions only affect a small portion of the table data, such as the rows that correspond to recent sales activity in a sales table. In such cases, it is often efficient to index the partitions of the data that are not actively updated (such as partitions 530a and 530b that contain historical data from past years in table T), but not index the partitions that will be updated on a constant basis (such as partition 530c in table T that contain data for the current year and therefore is likely to be continually updated). This approach of indexing some but not all of the data is referred to as a "partial index" or "partial indexing".

Conventionally, if a table is partially indexed, a query that accesses only the indexed partitions can use the index to execute the query. However, if even one partition that is accessed is not indexed or the partitions that are accessed cannot be determined statically (during optimization), then the index cannot be used at all.

Embodiments of the invention utilize a new query transformation, referred to herein as a "table expansion," which allows the index to be used on the portions of data that are indexed and also allows sequential scan to be performed for the non-indexed partitions. For a partial index as described above, the result is that a very small portion of the data must be scanned via sequential scan.

FIG. 1 provides an illustration of a system 100 for implementing hybrid execution plans according to some embodiments of the invention. System 100 may include one or more users at one or more user stations 124 that operate the system 100 to execute queries using a database management system (DBMS) 120 to access data in data storage device 126. DBMS 120 comprises a hybrid transformation module 102 and an optimizer 138. The example data shown in FIG. 1 includes a partitioned data 130 that includes three partitions 132a, 132b, and 132c. Indexes 128a and 128b have been created that correspond to partitions 132a and 132b, respectively. It is noted that partition 132c has not been indexed.

According to some embodiments, the hybrid transformation module 102 operates by re-writing queries to allow the optimizer 138 to provide a hybrid execution plan where a first subset of the data being queried may utilize an access path that is different from the access path used by a second subset of the data. This can be achieved in the hybrid transformation module 102 by replicating the table access into two branches of a "union all" query block, so that some or all of the partitions that are indexed (i.e., partitions 132a and 132b) can be referenced in a first branch which can use the index in the execution plan, and the rest of the partitions which cannot or should not use the index (i.e., partition 132c) are accessed by a separate branch. In effect, two different execution plans can be used for the two different portions of data, e.g., indexed and non-indexed plans. According to some embodiments, the transformation is cost-based, so that the expansion is performed only if the optimizer 138 believes that the expansion will result in a more efficient execution plan.

In system 100, user station 124 comprises any type of computing station that may be used to access, operate, or interface with DBMS 120 and data storage device 126, whether directly or remotely over a network. Examples of such user stations 124 include for example, workstations, personal computers, or remote computing terminals. User station 124 comprises a display device, such as a display monitor, for displaying processing results or data to users at the user station 124. User station 124 also comprises input devices for a user to provide operational control over the activities of some or all of system 100.

Data storage device 126 may correspond to any type of computer readable medium in any storage format or data storage architecture, e.g., database tables in a relational database architecture. The data storage device 126 comprises any combination of hardware and software that allows for ready access to the data that is located at the data storage device 126. For example, data storage device 126 could be implemented as computer memory operatively managed by an operating system. The data storage device 126 could also be implemented as a database system having storage on persistent and/or non-persistent storage.

Figure 2:
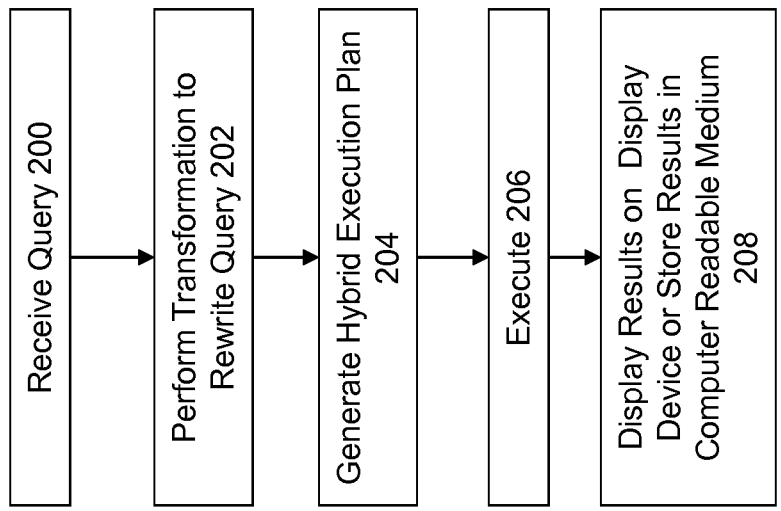
FIG. 2 shows a high level flowchart of an approach for performing hybrid query optimization according to some embodiments of the invention.

FIG. 2 shows a high level flowchart of an approach for implementing some embodiments of the invention. At 200, a query is received which accesses a set of data having identifiable subsets, where the possibility exists that the there are different optimizer decisions (e.g., selection of different access paths) that can be made for the different subsets of data. This situation exists, for example, if the query is seeking to access a partitioned table where an index exists for some but not all of the partitions.

Next, at 202, a transformation (e.g., a table expansion transformation) is performed to create a re-written query. The re-written query must be semantically equivalent to the original query, so that any result set generated by the re-written query will have the same set of data results as the original query. However, the original query is transformed into a re-written structure that allows an optimizer, at 204, to generate a hybrid execution plan which permits different access paths to be employed for different subsets of the data being queried.

According to some embodiments, the table expansion transformation operates by re-writing the table access portion of the query into two branches of a "union all" query block, so that the partitions that use a first access path are referenced in a first branch and the partitions which use a second access path are referenced in a second branch. In this way, two different execution plans can be generated and used for the two different subsets of data. Of course, any number of branches can be created so that, if appropriate, the query can be re-written to include any number of branches that operate with any number of access paths/execution plans.

After the hybrid execution plan has been generated by the optimizer at 204, then at 206 the execution can be executed by the DBMS. For a hybrid execution plan, the execution of the query will involve different access paths and/or execution plans for the different subsets of the data. Thereafter, at 208, the results of query execution can be displayed to the user on a display device or stored onto a computer readable medium.

FIG. 3 shows a flowchart of an approach for performing table expansion transformations according to some embodiments of the invention. In general, this approach operates by exploring the state space of possible queries that are semantically equivalent to the original query, where the intent is to identify a transformation that provides for more efficient execution than the original query.

At 300, a validity check is performed and identification is made of possible expansion states for the transformation. The validity check is made to ensure that the query is eligible for table expansion and/or whether it is possible to re-write the query such that the re-written query is semantically equivalent to the original query.

The exploration of the possible state space is performed by identifying potential transformations that can be made which are reflective of the different ways in which subsets of the data being queried may be accessed to execute the query. In general, this action involves identification of a query block in the original query which can be transformed into multiple branches or query blocks in a re-written query. The branches or query blocks in the re-written query would associate partitions together that have the same access path properties, e.g., by forming a first branch to group together partitions to be accessed with indexes and by forming a second branch to group together partitions to be accessed with a sequential scan. Indexes on a given table may be reviewed as part of this process, to identify any indexes that are usable for the table expansion, and also to identify any indexes that should be pruned from consideration as being unusable.

Therefore, the general principle of the table expansion transformation is that a table can be divided into disjoint row sets based on certain common properties. The query structure referencing the table is duplicated across several union all branches where the table reference is replaced by the reference to one row set. The predicate(s) for each branch are expressed for columns of the table that are mapped to the table properties considered by the table expansion transformation.

According to some embodiments, the validity checks are specific to the type(s) of table expansions that apply, and are performed to ensure that the query is "eligible" for table expansion, and to make sure that any transformed queries being considered are semantically equivalent to the original query. For example, when considering table expansions for partition groupings based on local index partition status, the validity check may include: (1) check whether the query block contains a table that is partitioned; (2) check whether the partitioned table has both "usable" index partitions and/or "unusable" index partitions in a local index, where an index may correspond to an unusable partition if, for example, an index or index partition is in an invalid state or has not been properly maintained; (3) check if the partitioned table involved in an outer join, it should be on the left side of a left outer join. Otherwise if it's on the right side of left outer join, in each branch unnecessary NULLs may be generated on the right side of the join. Similarly, the partitioned table should be on the right side of a right outer join, and it should not be involved in a full outer join.

According to some embodiments, part of the process for performing table expansion transformation is to decide how to group partitions based on the usable/unusable status of local indexes. In general, partitions of one table are grouped based on the status of indexes on these partitions. For each partitioned table there may be multiple indexes. Each group of partitions will be accessed in only one of the union all branches of the transformed query block. The goal of the partition grouping is that partitions belong to the same group can be physically accessed in exactly the same way. Therefore all the indexes on each group of partitions must have the same status. Partition grouping can be implemented by encoding each partition based on the status of all relevant indexes, where partitions with the same encoded value belong to the same group.

It is noted that even if there are indexes that are usable in a branch query block, the optimizer will not necessary choose to use those indexes. This is because the query may actually be more efficient in certain circumstances by performing the sequential scan even if the index exists and is usable, e.g., when the query seeks almost all of the rows from the table. Hence, two branch query blocks could end up with the same plan anyway. In this case, it may be advantageous to coalesce the branches into one. This would save time during optimization due to fewer query blocks to separately optimize (as described in more detail below in conjunction with FIG. 4), and/or would be more efficient during execution since there would be fewer block to execute. In some embodiments, one partition grouping is employed per table. However, by applying branch coalescing, it is likely that there may have several partition groupings per table. This can be realized by implementing branch coalescing.

With regards to predicate generation, the process for generating the union all branches may be implemented by taking a list of partitions as input and generating predicates that will select rows from only those partitions. One way to achieve this is by generating predicates that are formed to select out only the relevant rows from a group of partitions. The predicates may be range predicates (for range partitioning), in-lists (for list partitioning) or may employ a function that checks if a given row is in a given partition.

With regard to range predicate generation, if a branch is to contain references to many range partitions, the most straight-forward approach to generating the predicates is to generate a predicate such as the following:

$$c >= L \text{ and } c < U$$

for each partition, where L is the lower bound and U the upper bound of the partition. Then all of these predicates are OR'd together. This results in a predicate like:

$$(c >= 10 \text{ and } c < 20) \text{ OR } (c >= 20 \text{ and } c < 30) \text{ OR } (c >= 30 \text{ and } c < 40)$$

which can be simplified to:

$$c >= 10 \text{ and } c < 40$$

The long predicate can be generated and then simplified, or the simplified predicate can be generated to begin with. Simplifying it later means that these useless predicates will be allocated, and there will also be also some work traversing the predicates to look for opportunities to simplify them.

Therefore, in some embodiments, the simpler predicate is created from the beginning. To accomplish this, a bit vector is created which denotes the partitions that appear in a branch, e.g., g. for a table where partitions 1 through 3, and 6 belong to a branch, the bit vector would appear as "100111". The bit vector can be scanned to find contiguous sets of "1" values. For each contiguous set from bit y to bit z, a predicate is generated as follows:

$c>=L(y)$ and $c<U(z)$ where L(p) is the lower bound of partition p and U(p) is the upper bound of partition p. Thus for the bitvection "100111", the generated predicate might be:

(c>=10 and c<40) OR (c>=60 and c<70)

With regards to predicate simplification, if the user query contains predicates on the partitioning columns, then after transformation there may be opportunities to simplify the predicates. The following are some examples:
Original predicate: Range AND Equality
C<=10 AND c=5
Simplified Predicate: C=5
Original predicate: Range OR Equality
C<=10 OR c=5
Simplified Predicate: C<=10

Simplifying predicates is also likely to result in better costing behavior by the optimizer. Of course, one skilled in the art would realize that any suitable predicate simplification approach may be utilized in embodiments of the invention, depending upon the specific applications to which the invention is directed.

Returning back to FIG. 3, at 302, after checking the possible state space for the query re-write, a determination is made whether there is a range of valid possible states that need to be considered. If not (i.e., only the original query needs to be considered), then this means that there are no possible table expansion transformation candidates, e.g., because the query has a form that does not legally allow for an appropriate re-write. In this situation, the process proceeds directly to 312 with the conclusion that the original query is to be executed.

However, if there is a range of valid possible states that need to be considered, then this means that there is at least one table expansion transformation candidate that is legal (i.e., is semantically equivalent to the original query and has passed the validity checks).

At 304, cost analysis is performed to determine which of the possible table expansion transformation candidates is the most efficient. Since the transformation introduces a new union all query block into the query where there was previously no set query block, analysis should be performed to determine whether the transformed query will indeed provide performance benefits over the original query.

At 306, identification is made of the lowest cost option of the different options, which includes the results of comparing the costs of the table expansion transformation candidates as well as the costs of the original query. At 308, a determination is made whether the lowest cost option is a table expansion transformation candidate. If so, then at 310 query re-write is performed to re-write the query. Otherwise, at 312, the original query is retained.

Any suitable approach can be taken to perform the above analysis and query re-write process. One possible approach that can be taken to perform query re-writes is disclosed in U.S. Patent Publication 2005/0283471, filed on Jun. 22, 2004, which is hereby incorporated by reference in its entirety.

In some situations, there is the possibility that cardinality estimates and column statistics for set query blocks are of low quality. This may impact the quality of optimization of outer query blocks containing the expanded query block. To alleviate this problem, statistics can be used for the untransformed query block in place of the manufactured statistics for the union all.

Techniques may be applied to control the time that is taken to perform the table expansion transformation. The optimization time of the table expansion transformation is generally controlled by two factors: 1) the number of partitioned tables in the query block, and 2) the number of partition groups for each table. The number of partitions groups can possibly be cut down by performing index pruning and early partition pruning.

With index pruning, indexes that will not be used in access path selection for the query block can be pruned before performing the partition-grouping approach described above. This can decrease the number of partition groups and therefore the number of branches in the transformed query block. An index on the partitioned table can be pruned if none of its index columns are referenced in any of the predicates in the query block. In addition, if all of the indexes containing partitions of mixed status are pruned, then table expansion can be skipped entirely for the table.

Early partition pruning can also be applied before performing partition-grouping to eliminate the partitions that will not be accessed for the given query. If the query block contains predicates on the partitioning key, then partition pruning may be performed to remove the extraneous partitions. It is possible that after pruning based on user predicates on the partitioning key, only a subset of partitions will be accessed in the query block. Fewer partitions may lead to fewer partition groups and hence fewer union all branches.

One general rule that can be applied to control the total optimization time of table expansion is to make sure that only one partitioned table is expanded at a time. If the query block contains multiple partitioned tables, then one table will be chosen at a time as the candidate for expansion, starting with the largest table (e.g., based upon the size of the base table or the size of the table after filtering). For example, if the query block contains two partitioned tables, T1 and T2, then there may be three iterations for the transformation. In the first iteration, the non-transformed query block is cost analyzed. In the second iteration, only T1 is expanded and the transformed query block is cost analyzed. Finally, only T2 is expanded and the transformed query is cost analyzed. This one-at-a-time strategy is referred to as a "linear search" and the number of states of the transformation is N+1 for N candidate tables.

Besides the linear search strategy, other state space search strategies may include exhaustive, interative and two pass strategies. The exhaustive strategy enumerates over all possible combinations. For a query with N partitioned tables, a total of $2^N$ states will be generated. The iterative strategy starts from an initial state and move to the next state only when it leads to less cost, and the same process is repeated for a different initial state. The number of states is between N+1 and $2^N$. The two-pass strategy chooses the best state from two states, where in one state all elements are transformed and in the other none of the elements are transformed. Except the linear search strategy, all of the above strategies require expanding more than one table at a time. This results in more union all branches being generated which does not necessarily lead to a better-cost plan. Therefore, in some embodiments, the linear state space search strategy is employed to control the time for performing the table expansion optimization.

In some embodiments, recursive expansion is not applied. Furthermore, index pruning and early partition pruning are applied before partition grouping to cut down the number of partition groups.

According to one embodiment, the maximum number of union all branches is the number of partitions in the table, in which case each partition belongs to a separate branch. If the number of partitions for the table is large, then the number of partition groups potentially can be large as well. An upper threshold can be placed on the maximum number of partition groups that can be generated.

FIG. 4 shows a flowchart of an approach for generating an execution plan for the re-written and transformed query. At 400, the transformed query is received by the optimizer. According to some embodiments, the transformed query includes multiple branches/query blocks that are tied together using the union all construct.

In general, each of these branches can be optimized with an access path and/or execution plan that is distinct or different from the access path and/or execution plan used for other branches. Therefore, at 402, a first branch is selected for processing. At 404, an execution plan is created for the branch which is specific for that branch, and which does not need to take into account the access paths used for any other branch.

Once the execution plan has been created for the branch, then at 406, a determination is made whether there are any additional branches that need to be processed. If so, then the process returns back to 402 to select a branch for processing. The above actions are iteratively performed until all branches in the query have been processed.

Thereafter, at 408, the overall execution plan is finalized for the query. The final execution plan is in essence a combination of the individual execution plans that have been created for the different branches, where the individual execution plans may be associated with different access paths, join order, join method, or other optimizer decisions.

Figure 5A:
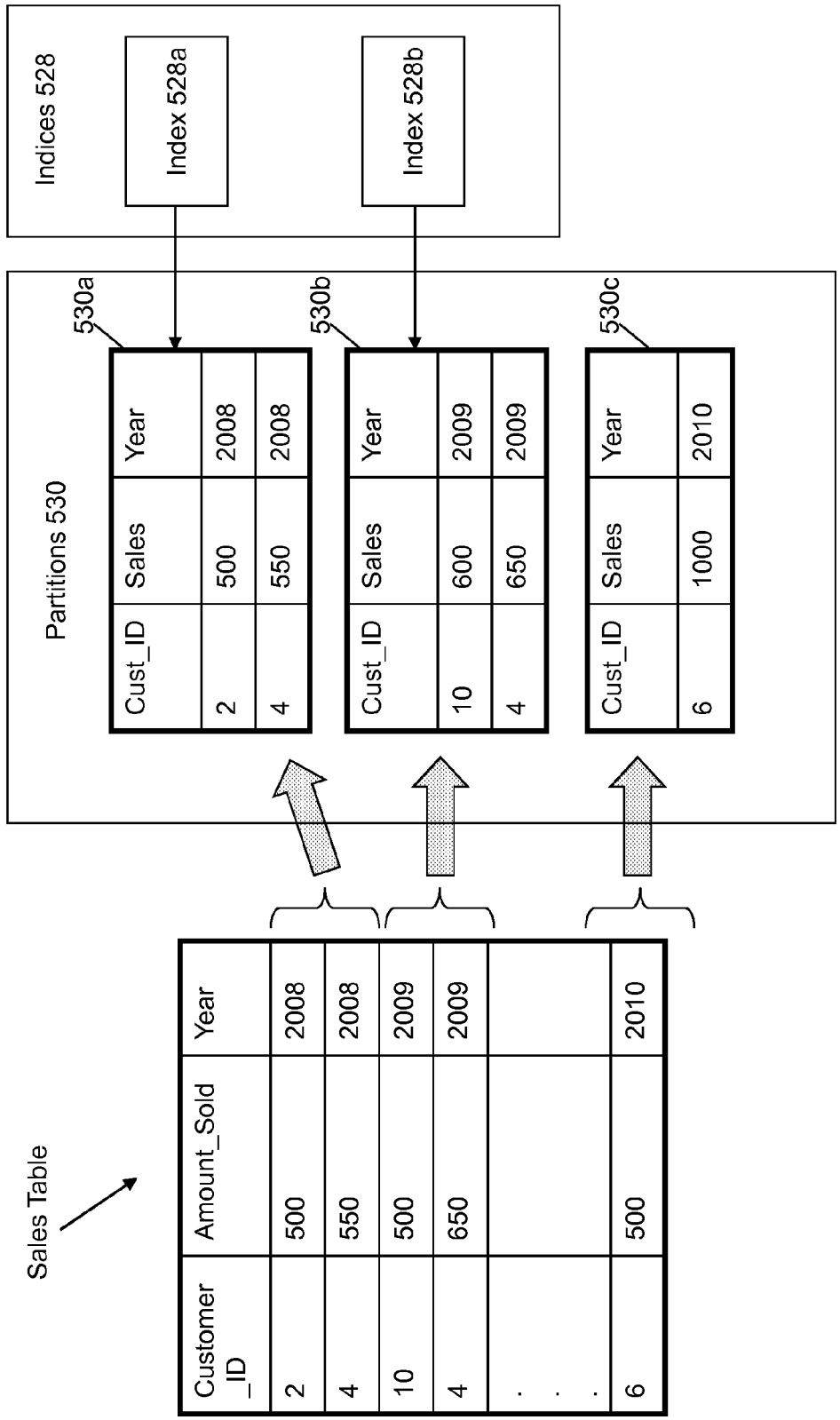
FIGS. 5A-E illustrate an embodiment of the invention according to some embodiments of the invention.

FIGS. 5A-E provides an illustrative example of the operation of an embodiment of the invention for a very simple query. FIG. 5A shows a Sales table which includes three columns, the "Customer_ID" column, "Amount_Sold" column, and a "Year" column. The Sales table is partitioned into multiple partitions 530 based upon the Year column. The partitioning was implemented by creating partitions to separately store the rows corresponding to the value in the Year column of the table. Therefore, as shown in the figure, a partition 530a is created and used to store all rows having the value "2008" in the Year column. Similarly, a partition 530b is created and used to store all rows having the value "2009" in the Year column and a partition 530c is created and used to store all rows having the value "2010" in the Year column. Indices 528 were created for the values in the Customer_ID column in the Sales table, where a separate index is created for some of the partitions. Here, an index 528a was created that corresponds to partition 530a and an index 528b was created which corresponds to partition 530b. However, no index has been created for partition 530c.

Figure 5B:
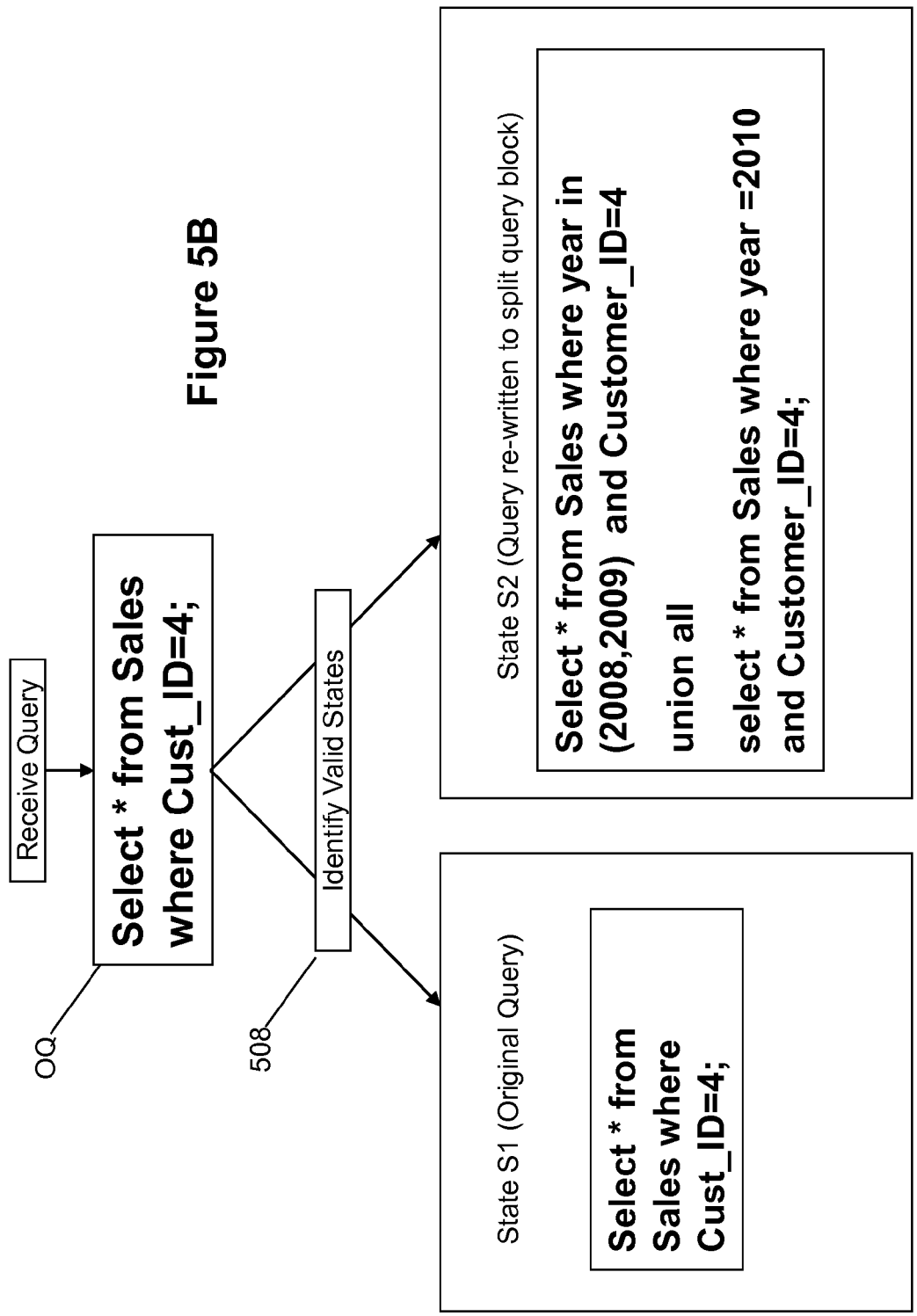

Referring to FIG. 5B, assume that an original query "OQ" has been received as follows:

Select * from Sales
where Customer_ID=4;

This very simple query is essentially asking for all rows from the sales table in FIG. 5A corresponding to a particular customer (i.e., having the value "4" in the Customer_ID column). Since only some of the partitions in the Sales table have been indexed and the index is relevant for this query, this query provides a reasonable candidate for the hybrid execution plan approach of the present invention. Therefore, at 508, the first action is to determine whether there are any valid table expansion candidates for the original query OQ. In this situation, there are at least two possible states in the state space of possible table expansion candidates, namely state S1 and state S2. State S1 refers to the original query OQ. State S2 is a re-written query that includes a table expansion transformation, as follows:

Select * from Sales where year in (2008, 2009) and Customer_ID=4
union all
Select * from Sales where year=2010 and Customer_ID=4;

The transformed query of state S2 takes the original query block, and creates two new branches that are combined using the union all construct. The first branch "Select * from Sales where year in (2008, 2009) and Customer_ID=4" corresponds to the two partitions 530a and 530b that are associated with indices 528a and 528b, respectively. Therefore, this branch of the re-written query can be optimized to use either an index-based access path or an access path that uses a sequential scan. The second branch "Select * from Sales where year=2010 and Customer_ID=4" corresponds to the partition 530c that is not indexed. Since this branch is not associated with an index, this branch is limited to an access path that uses a sequential scan.

Figure 5C:
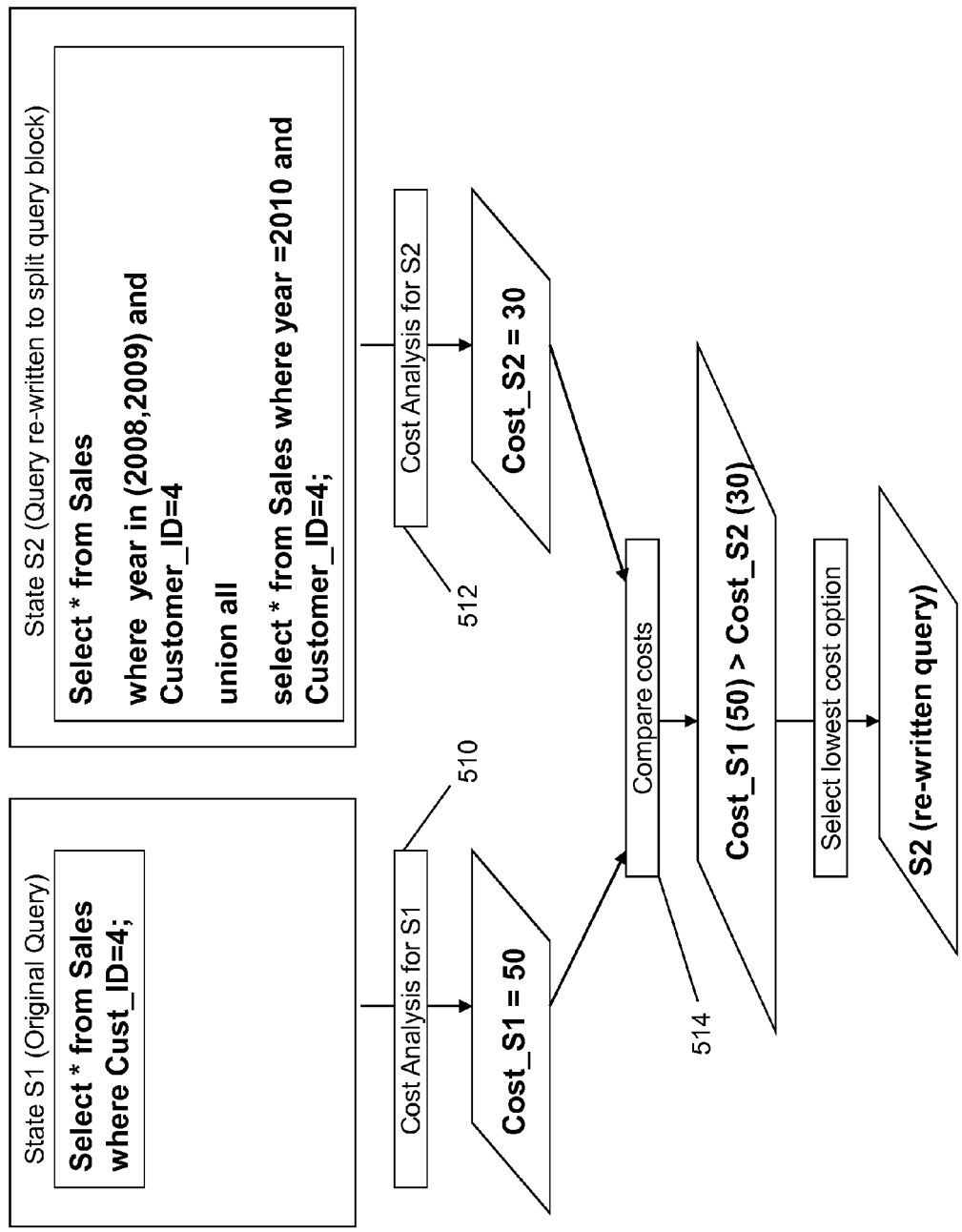

Next, as shown in FIG. 5C, costs analysis is performed for each of the states S1 and S2. Cost analysis 510 is performed on state S1, indicating that the cost of performing the original query is "50". Cost analysis 512 is performed on state S2, indicating that the cost of performing the re-written query is "30". One possible approach that can be taken to perform this type of cost analysis is disclosed in U.S. Patent Publication 2005/0283471, filed on Jun. 22, 2004, which is hereby incorporated by reference in its entirety.

At 514, cost comparisons are performed to identify the lowest cost option. In this case, it can be seen that the cost for state S1 (50) is greater than the cost for state S2 (30). Therefore, the table expansion transformation of state S2 is demonstrated to be cheaper (i.e., more efficient) than the original query. As a result, the query will be re-written as shown for state S2 prior to optimization and execution.

Figure 5D:
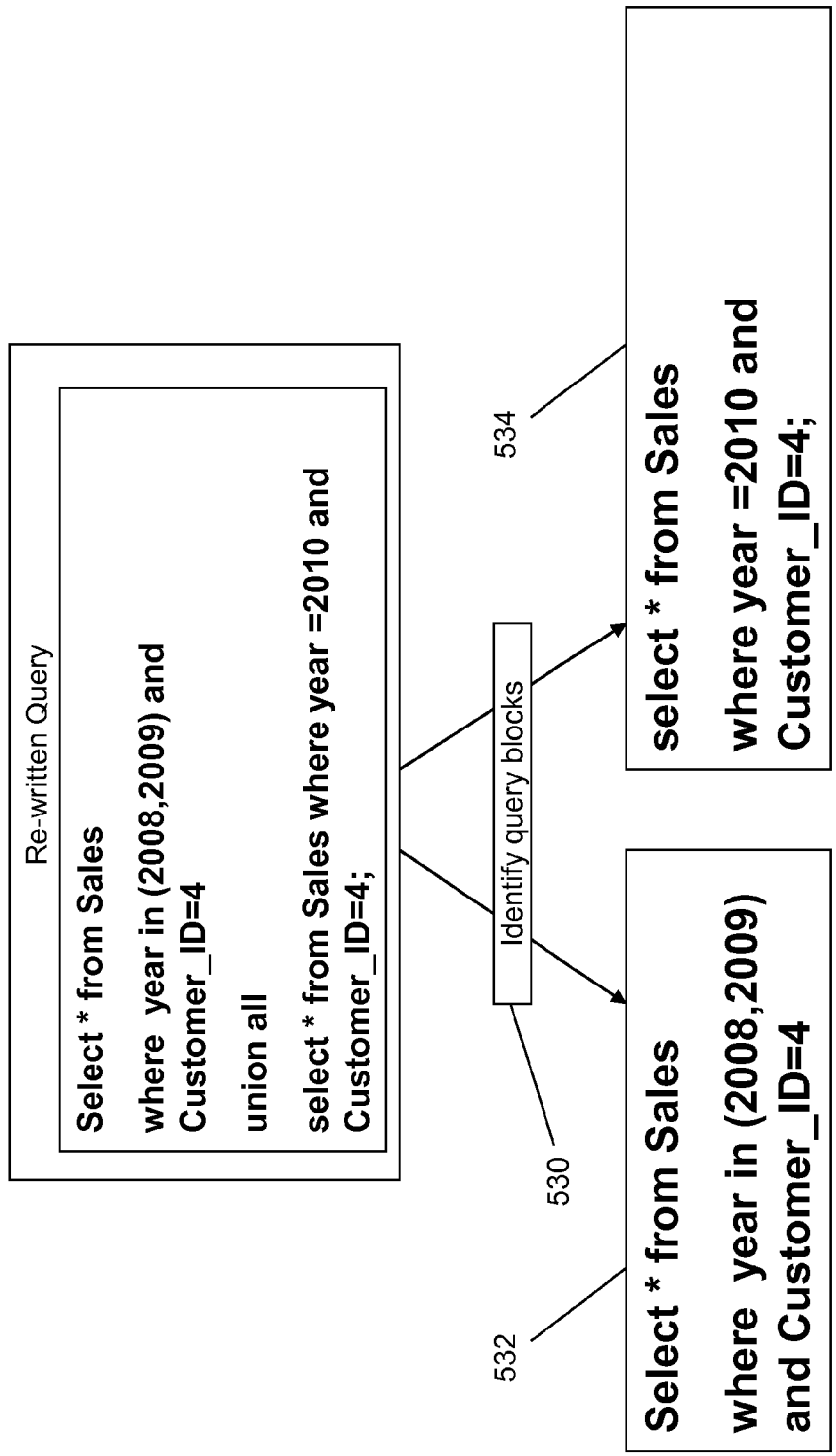

FIG. 5D continues by showing the process for optimizing this re-written query. At 530, the process begins by identifying the different branches/query blocks in the re-written query, e.g., by identifying the branches that are separated by the "union all" statement. In this case, there are two branches 532 and 534. Branch 532 corresponds to the query block in the re-written query directed to partitions 530a and 530b. Branch 534 corresponds to the query block in the re-written query directed to partition 530c.

Figure 5E:
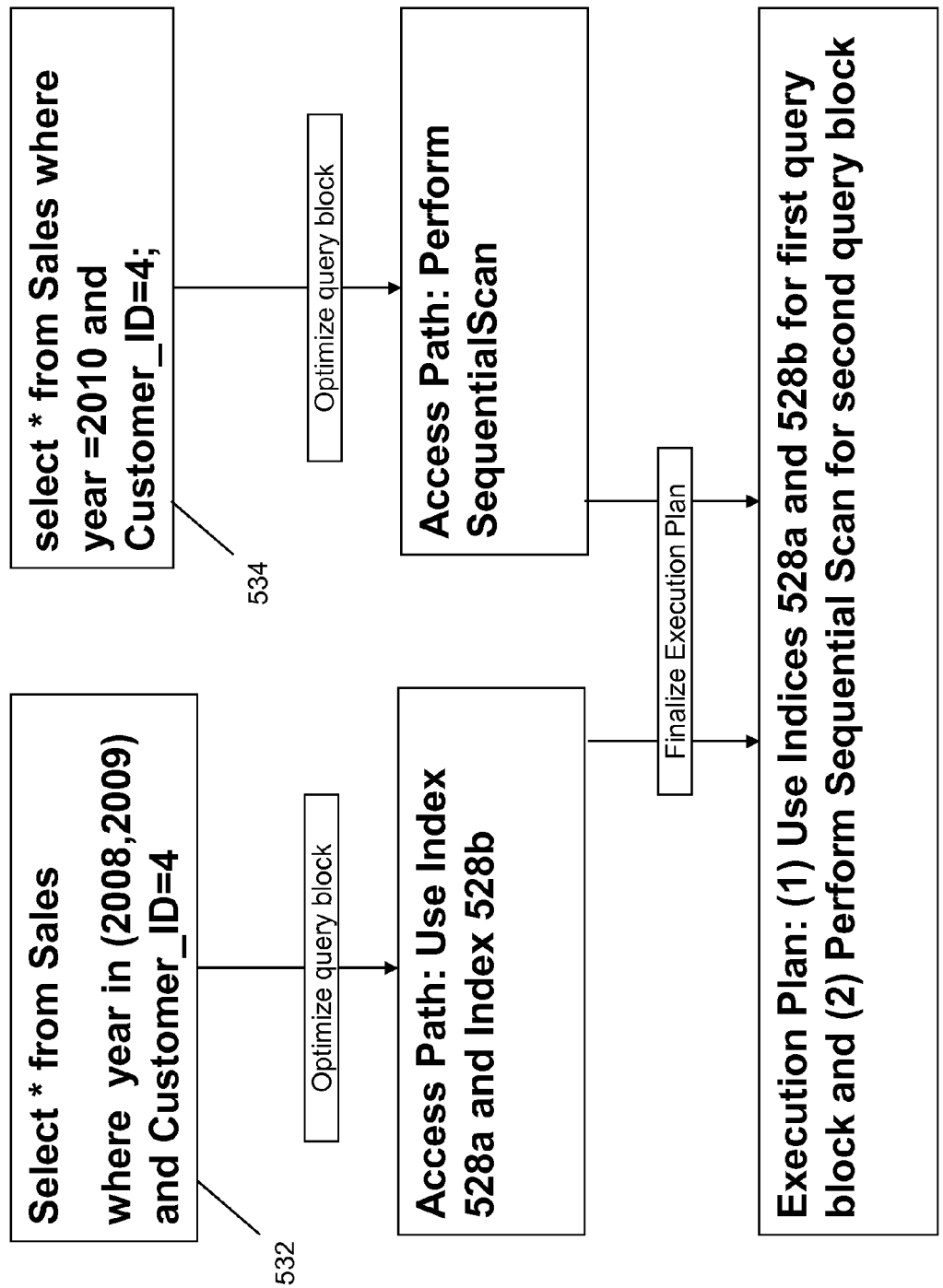

Next, as shown in FIG. 5E, each branch 532 and 534 of the re-written query is separately optimized. As previously noted, branch 532 corresponds to the query block in the re-written query directed to partitions 530a and 530b, and partitions 530a and 530b correspond to indexes 528a and 528b, respectively. Therefore, optimization of this branch 532 provides the option of using an access path that either uses indices 528a and 528b or performing a full table scan. In this example, it is assumed that the cheaper access path is to use indices 528a and 528b to execute branch 532 of the query. As such, the portion of the execution plan corresponding to branch 532 will designate the access path as utilizing indices 528a and 528b. In contrast, branch 534 can only be executed by performing a sequential scan, since the partition 530c associated with this branch 534 is not indexed. Therefore, the portion of the execution plan corresponding to branch 534 will designate the access path as utilizing a sequential scan.

This example demonstrates that a query can be re-written using a table expansion transformation, and that the re-written query can be processed such that the execution plan is a "hybrid" execution plan where different branches of the query are executed using different access paths and/or execution plans.

The table expansion transformation described above can be utilized in conjunction with other transformations as well. By interleaving multiple transformations, it may be possible to provide more efficient re-written queries than would otherwise be possible if only a single transformation is used by itself. One approach that can be taken to interleave multiple transformations is U.S. Pat. No. 7,702,627, which is hereby incorporated by reference in its entirety.

To explain, consider two transformations TA and TB, where there may be a need to perform TB after TA to decide upon TA. For example, if the cost of original query is C(Q)=40, the cost of performing TA alone is C(TA(Q))=50, and the cost of performing TB after TA is C(TB(TA(Q)))=30, then one will still choose to apply TA even though applying it alone leads to higher cost.

Figure 6:
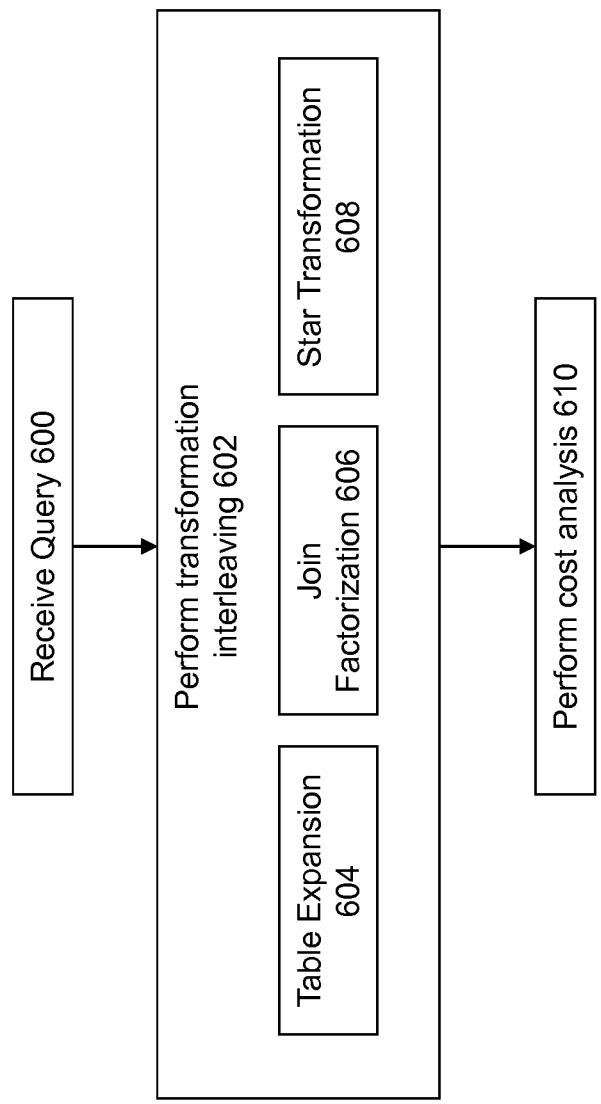
FIG. 6 shows a flowchart of an approach for interleaving multiple transformations to optimize a query according to some embodiments of the invention.

FIG. 6 shows a flowchart of an approach for interleaving different transformations according to some embodiments of the invention. At 600, a query is received for processing. This is the original, un-transformed query that is to be analyzed to determine if there is a beneficial transformation that may be applied to make query processing more efficient.

At 602, transformation interleaving is performed to provide multiple types of transformations against the query. Table expansion transformation 604 corresponds to the type of transformation that was previously described above.

Join factorization 606 refers to a type of query transformation where the branches of a union or union all query that joins a common table are combined to reduce access to the common table. The transformation can be expressed as (T1 join T2) union all (T1 join T3)=T1 join (T2 union all T3), where T1, T2, and T3 are three tables. Further details regarding an approach for implementing join factorization is described in U.S. Pat. No. 7,644,062, which is hereby incorporated by reference in its entirety.

Star transformations refer to a transformation that filters the rows in the fact table using indexes on the columns joining to dimension tables, and then retrieves the rows from the fact table after all such filtering has taken place. Further details regarding an approach for implementing star transformations is described in U.S. Pat. Nos. 5,848,408 and 5,963,932, which are hereby incorporated by reference in their entireties.

According to one embodiment, table expansion will be interleaved with star transformation and join factorization in that order. This is because both transformations can lower the cost of the a query block that has been table expanded, so even if a transformed query block costs more than the original query, table expansion combined with one of or both star transformation and join factorization can still lead to a lower cost plan. During interleaving, star transformation is applied before join factorization. This is because if join factorization is done first, it may have factored out the dimension tables that will be joined back in to the star transformation, making the latter non-applicable. After table expansion, star transformation is applied to each branch of the union all, while join factorization is applied to the whole query block at once.

For each table expansion, the following identifies four different transformed query blocks that can be cost analyzed and compared:

1. table expansion, star transformation and join factorization applied to the query.
2. table expansion, star transformation applied to the query.
3. table expansion, join factorization applied to the query.
4. only table expansion applied to the query.

Before generating the four transformed query blocks, the non-transformed query block is first cost analyzed. To generate the above four transformed query blocks and cost them, table expansion is applied first, then star transformation is applied to each union all branch that has indexed partitions, this transformed query is then handed over to join factorization, in which the two cases of join factorization being applied or not will both be tried and cost analyzed. For cases 3 and 4, one would still first apply table expansion, and then skip star transformation and hand over the transformed query block to join factorization. The cheapest of the five cases (including the non-transformed query block) will be chosen after cost analysis (610).

Figure 7A:
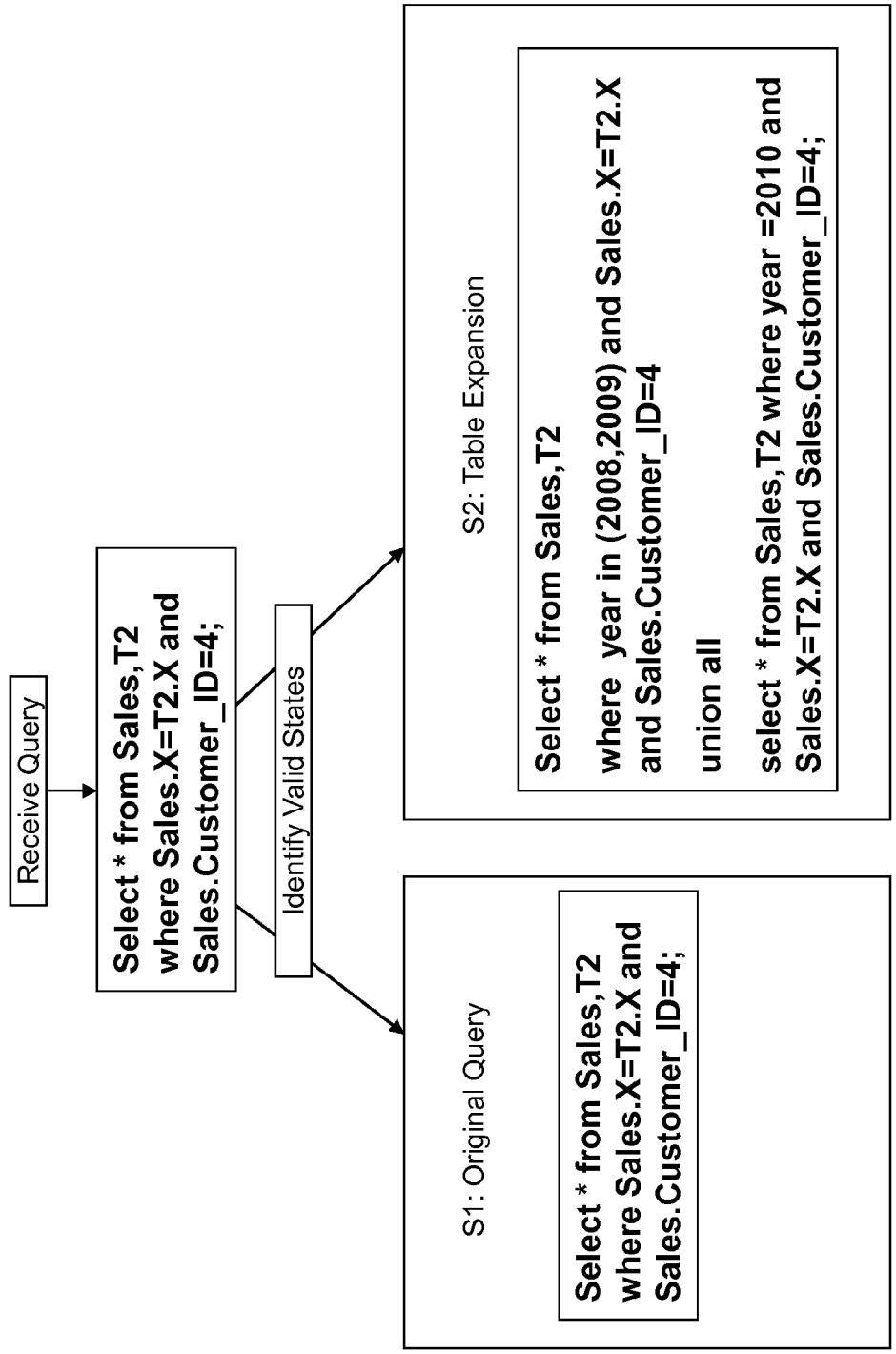
FIGS. 7A-D illustrate an embodiment of the invention for performing interleaved transformations according to some embodiments of the invention.

FIGS. 7A-D provides an illustrative example of the operation of an embodiment of the invention for interleaving transformations. FIG. 7A shows that an original query has been received as follows:

Select * from Sales, T2
Where Sales.X=T2.X
And Sales.Customer_ID=4;

Assume that the Sales table corresponds to the Sales table shown in FIG. 5A and that table T2 corresponds to another table that has an extremely large number of rows. This query is essentially asking for rows from the Sales table and table T2, where the join condition is in the where clause, "Sales.X=T2.X", and where the value of the Customer_ID column in the Sales table is "4". It is assumed that "X" refers to a column that exists in both table T2 and the Sales table (which is not currently shown in FIG. 5A) which provide an appropriate vehicle for the join condition. If only the table expansion transformation is applied by itself to this query, then the transformation query is as shown in FIG. 7A. Like the previous example of FIGS. 5A-E, the valid table expansion candidates for the original query results in a re-written query that contains two new branches that are combined using the union all construct:

Select * from Sales, T2 where year in (2008,2009) and Sales.X=T2.X and
  Sales.Customer_ID=4
  Union all
  Select * from Sales, T2 where year=2010 and Sales.X=T2.X and
  Sales.Customer_ID=4;

The first branch "Select * from Sales, T2 where year in (2008,2009) and Sales.X=T2.X and Sales.Customer_ID=4" corresponds to the two partitions 530a and 530b that are associated with indices 528a and 528b, respectively. Therefore, this branch of the re-written query can be optimized to use either an index-based access path or an access path that uses a sequential scan. The second branch "Select * from Sales, T2 where year=2010 and Sales.X=T2.X and Sales.Customer_ID=4" corresponds to the partition 530c that is not indexed and is an access path that uses a sequential scan.

Figure 7B:
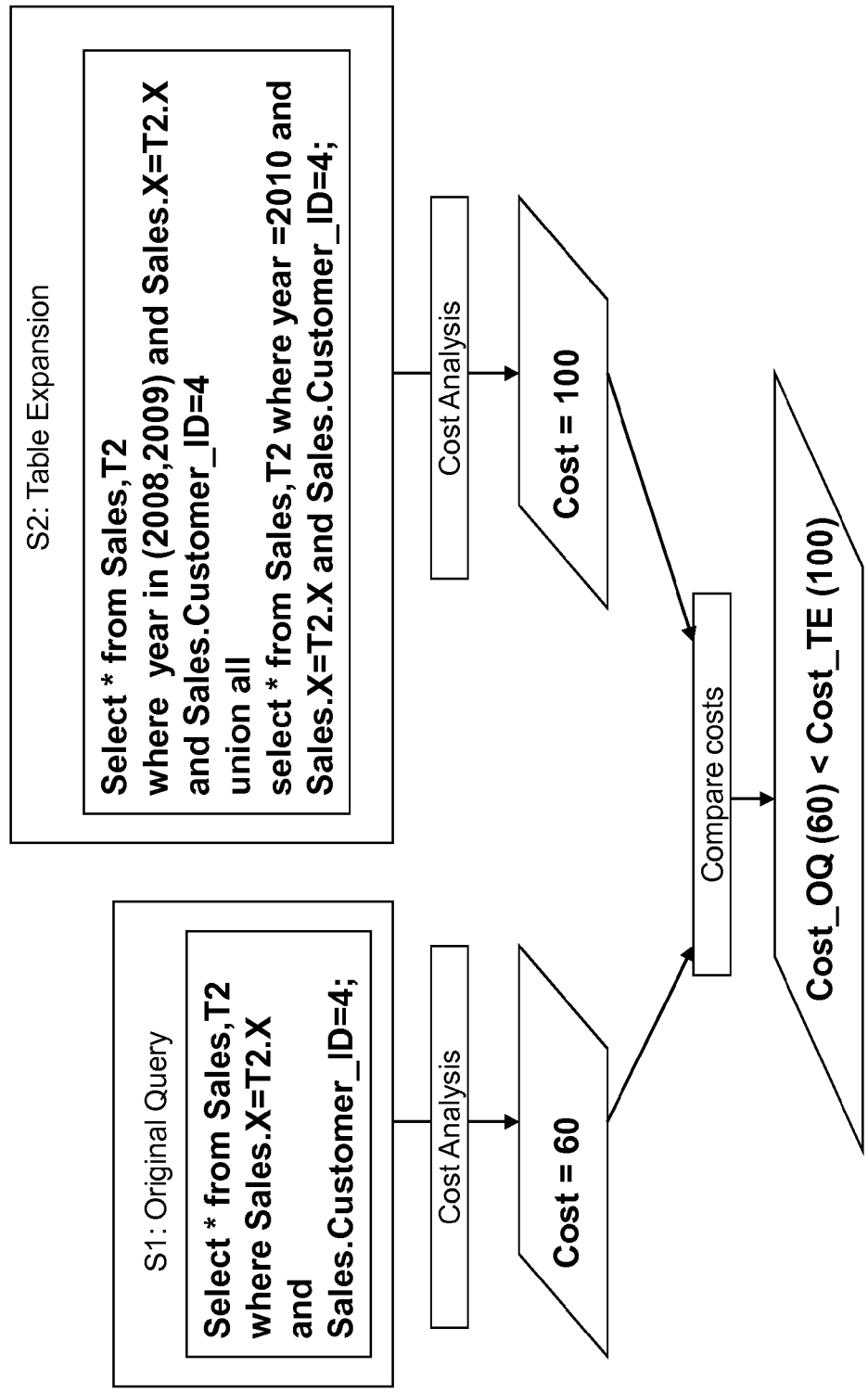

Next, as shown in FIG. 7B, costs analysis is performed for each of the states S1 for the original query and S2 for the transformed query. Cost analysis is performed on state S1, indicating that the cost of performing the original query is "60". Cost analysis 512 is performed on state S2, indicating that the cost of performing the re-written query is "100". Clearly, the cost of S2 is much higher than S1, and hence it would not make sense to select the transformed query of S2 over the original query of state S1.

The reason for the high cost of the transformed query in state S2 is because each branch of the query in S2 must separately join with table T2, which means that two entire sequential scans of table T2 may need to be performed. If table T2 is very large (as stated above), then the transformed query in state S2 will be very expensive.

Figure 7C:
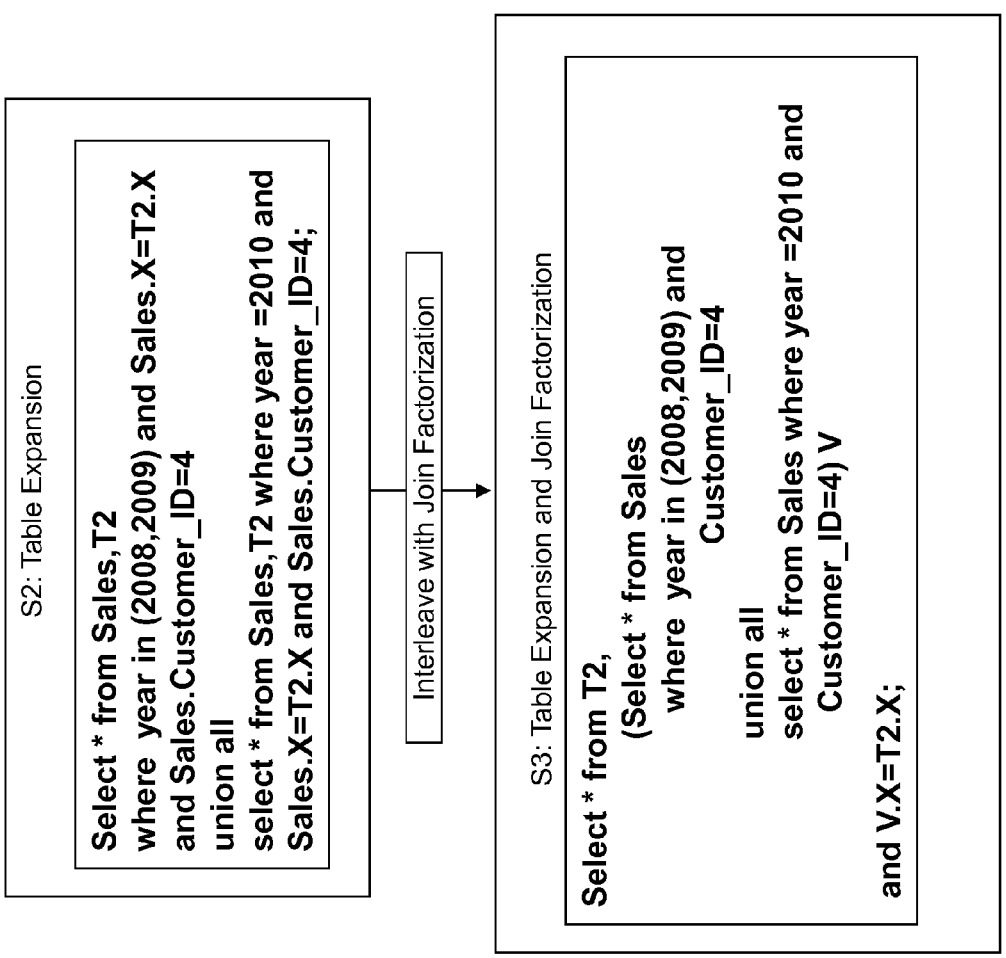

However, it is quite possible that interleaving another transformation with the table expansion of state S2 will result in a re-written query that may be more efficient than the original query of state S1. For example, consider the situation when the join factorization transformation is interleaved with the table expansion transformation. As shown in FIG. 7C, the query that has been transformed with the table expansion transformation:

Select * from Sales, T2 where year in (2008,2009) and Sales.X=T2.X and
  Sales.Customer_ID=4
  Union all
  Select * from Sales, T2 where year=2010 and Sales.X=T2.X and
  Sales.Customer_ID=4;

can be interleaved with the join factorization transformation to obtain the following transformed query:

Select * from T2
  (Select * from Sales where year in (2008,2009) and Sales.Customer_ID=4
  Union all
  Select * from Sales where year=2010 and Sales.Customer_ID=4) V
  and V.X=T2.X;

In this transformed query, the join to table T2 has been moved to the outer portion of the query, and it is evident that the inner portion of this transformed query is now identical to the transformed query shown in FIG. 5B. What this means is that join operation to table T2 no longer needs to be duplicated for each branch of the inner query.

Figure 7D:
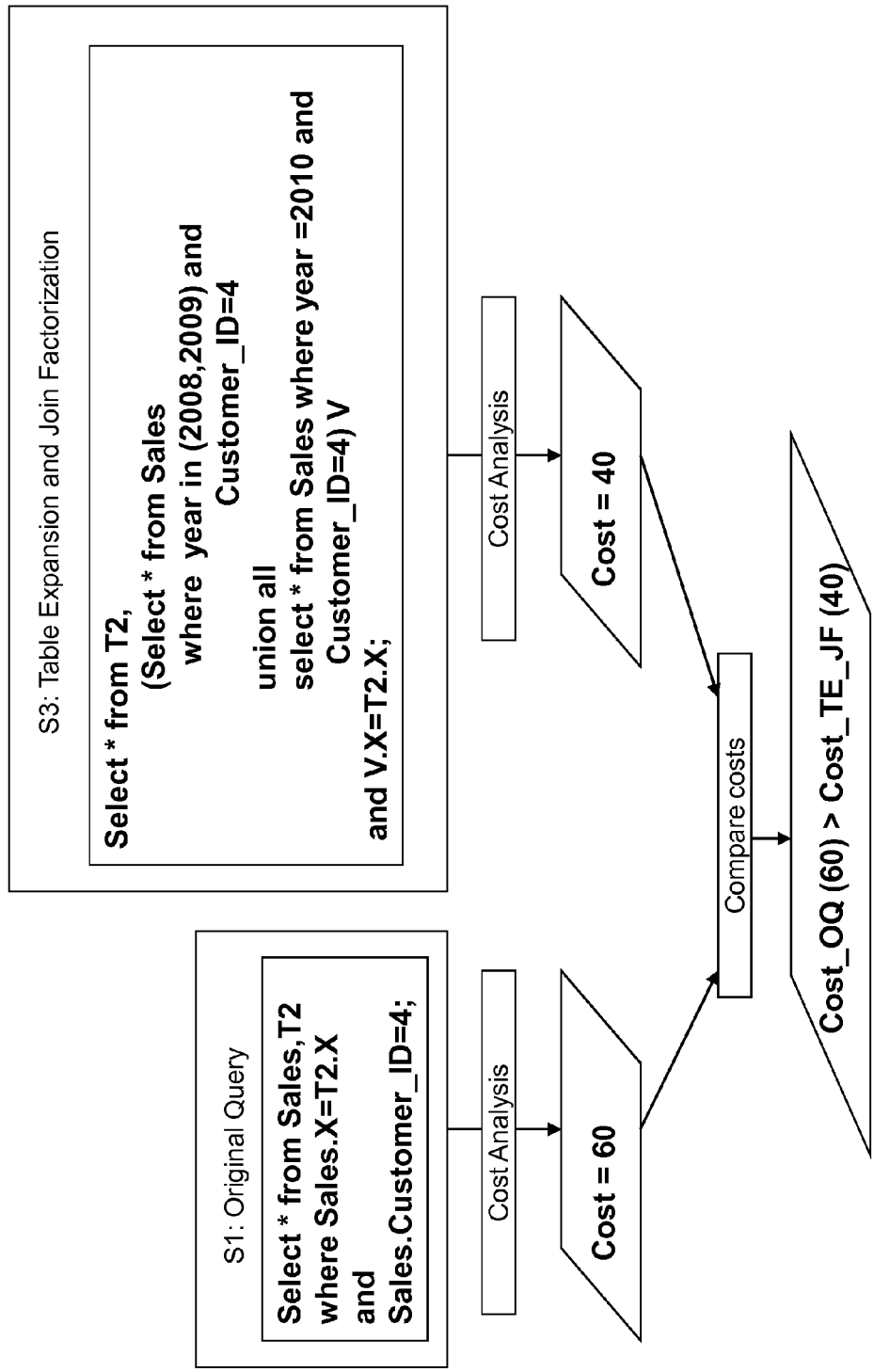

When cost analysis is performed, as shown in FIG. 7D, the results of the cost 40 for state S3 for the interleaved query shows that in this example, the interleaved transformation has resulted in a cheaper state S3 than the cost 60 of the original query for state S1. On this basis, since the cost of Si is higher than the cost of S3, it would make sense to re-write the query to the form shown in state S3.

Therefore, as demonstrated in this example, interleaving multiple transformations may make it possible to provide more efficient re-written queries than would otherwise be possible if only a single transformation is used by itself.

The interleaving of transformations makes it more feasible to use index-based plans for tables with high transaction volume. In particular, star transformation becomes useful in such scenarios. Star transformation is especially important given all of the recent interest in column-oriented query processing, since it works well for many of the kinds of queries where column-oriented databases excel.

Therefore, what has been described above is an improved approach for query processing where hybrid execution plans can be created and used to efficiently process queries such that a first subset of data is processed using a first access path and a second subset of data is processed using a second (different) access path. While the above example is described specifically in conjunction with partitions and indexes, it is noted that the invention may equally be applied to other types of data configurations, execution plans, access paths, and applications. For example, a distinction can be made between a first data subset that is stored on a first type of storage medium and a second data subset that is stored on a second type of storage medium, e.g., between fast (memory) and slow (hard drive) storage mediums or between local and remote storage mediums. In this situation, the optimizer can use the invention to implement and utilize different access approaches/plans for the different subsets of data. As another example, the difference between the two data sets might be the type of compression used on the two data sets. In each case, the optimizer may choose different plans that are optimal for the different data sets based on these compression properties.

System Architecture Overview

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for optimizing a query, comprising:
   receiving a query that accesses a set of a data having a first subset accessible by index and an established second subset accessible by sequential scan and not accessible by index wherein the query is permitted to access the set of data by sequential scan and not by index;
   using a processor to perform a transformation to re-write the query based on the first subset of data being accessible by index and the second subset of data being accessible by sequential scan and not accessible by index which results in a transformed query, wherein the transformed query includes a first query portion corresponding to the first subset that is permitted to access the first subset of data by index and a second query portion corresponding to the second subset that is permitted to access the second subset by sequential scan; and
   optimizing the transformed query such that the first query portion corresponds to a first execution plan and the second query portion corresponds to a second execution plan, wherein the first execution plan is different from the second execution plan.

2. The method of claim 1 in which the query is transformed into the transformed query by taking an original query block and replicating the original query block into the first query portion and the second query portion connected by a union all statement.

3. The method of claim 1 in which the first subset of the data and the second subset of the data are partitions of a partitioned table.

4. The method of claim 3 in which partition groupings are analyzed to identify partitions that should be grouped together for a common execution plan.

5. The method of claim 3 in which partition pruning is performed to remove unnecessary partitions from consideration.

6. The method of claim 1 in which either the first and second execution plans comprise an access path that corresponds to an index access or a sequential scan.

7. The method of claim 6 in which index pruning is performed.

8. The method of claim 1 in which a validity check is performed for the transformation to determine whether the query can be transformed.

9. The method of claim 1 in which predicate generation is performed.

10. The method of claim 1 in which costs analysis is performed to identify an efficient transformation from among a group of candidate query formats.

11. The method of claim 1 in which selection of the transformed query is performed using a linear search strategy, exhaustive searching, iterative searching, and two pass searching.

12. The method of claim 1 in which multiple transformations are applied to generate the transformed query.

13. The method of claim 12 in which the multiple transformations comprise a combination of table expansion, star transformation, or join factorization.

14. A computer implemented method for executing a query, comprising:
   receiving a transformed query that is intended to access a set of a data having an established first subset accessible by index and an established second subset accessible by sequential scan and not by index, wherein the transformed query is transformed from a query that is permitted to access the set of data by sequential scan and not by index;
   wherein the query is transformed into the transformed query based on the first subset of data being accessible by index and a second subset of the data being accessible by sequential scan and not accessible by index, the transformed query including a first query portion that corresponding to the established first subset of data that is permitted to access the first subset by index and a second query portion corresponding to the established second subset data that is permitted to access the second subset by sequential scan; and
   wherein the query has been optimized such that the first query portion corresponds to a first execution plan and the second query portion corresponds to a second execution plan; and
   using a processor to execute the transformed query by using the first execution plan to access the first subset of data and using the second execution plan to access the second subset of data.

15. The method of claim 14 in which the first subset of the data and the second subset of the data are partitions of a partitioned table.

16. The method of claim 14 in which either the first and second execution plans comprise an access path that corresponds to an index access or a sequential scan.

17. The method of claim 14 in which the query resulted from multiple transformations that were applied to generate the query.

18. The method of claim 17 in which the multiple transformations comprise a combination of table expansion, star transformation, or join factorization.

19. A computer program product embodied on a non-transitory computer usable medium, the computer readable medium having stored thereon a sequence of instructions which, when executed by a processor causes the processor to execute a method for optimizing a query, the method comprising:
   receiving a query that accesses a set of a data having an established first subset accessible by index and an established second subset accessible by sequential scan and not accessible by index, wherein the query access the set of data by sequential scan and not by index;
   using a processor to perform a transformation to re-write the query based on the first subset of data being accessible by index and the second subset of data being accessible by sequential scan and not accessible by index which results in a transformed query, wherein the transformed query includes a first query portion corresponding to the first subset that is permitted to access the first subset of data by index and a second query portion corresponding to the second subset that is permitted to access the second subset by sequential scan; and
   optimizing the transformed query such that the first query portion corresponds to a first execution plan and the second query portion corresponds to a second execution plan, wherein the first execution plan is different from the second execution plan.

20. The computer program product of claim 19 in which the query is transformed into the transformed query by taking an original query block and replicating the original query block into the first query portion and the second query portion connected by a union all statement.

21. The computer program product of claim 19 in which the first subset of the data and the second subset of the data are partitions of a partitioned table.

22. The computer program product of claim 19 in which either the first and second execution plan comprise an access path that corresponds to an index access or a sequential scan.

23. The computer program product of claim 19 in which a validity check is performed for the transformation to determine whether the query can be transformed.

24. The computer program product of claim 19 in which costs analysis is performed to identify an efficient transformation from among a group of candidate query formats.

25. The computer program product of claim 19 in which multiple transformations are applied to generate the transformed query.

26. The computer program product of claim 25 in which the multiple transformations comprise a combination of table expansion, star transformation, or join factorization.

27. A computer program product embodied on a non-transitory computer usable medium, the computer readable medium having stored thereon a sequence of instructions which, when executed by a processor causes the processor to execute a method for executing a query, the method comprising:
 receiving a transformed query that is intended to access a set of a data having an established first subset accessible by index and an established second subset accessible by sequential scan and not by index, wherein the transformed query is transformed from a query that is permitted to access the set of data by sequential scan and not by index;
 wherein the query is transformed into the transformed query based on the first subset of data being accessible by index and the second subset of data being accessible by sequential scan and not accessible by index, the transformed query including a first query portion corresponding to the established first subset of data that is permitted to access the first subset by index and a second query portion corresponding to the established second subset of the data that is permitted to access the second subset by sequential scan; and
 wherein the transformed query has been optimized such that the first query portion corresponds to a first execution plan and the second query portion corresponds to a second execution plan; and
 using a processor to execute the transformed query by using the first execution plan to access the established first subset of data and using the established second execution plan to access the second subset of data.

28. The computer program product of claim 27 in which the first subset of the data and the second subset of the data are partitions of a partitioned table.

29. The computer program product of claim 27 in which either the first and second execution plans comprise an access path that corresponds to an index access or a sequential scan.

30. The computer program product of claim 27 in which the query resulted from multiple transformations that were applied to generate the query.

31. The computer program product of claim 30 in which the multiple transformations comprise a combination of table expansion, star transformation, or join factorization.

32. A computer-based system for optimizing a query, comprising:
 a computer processor to execute a set of program code instructions;
 a memory to hold the program code instructions, in which the program code instructions for:
 receiving a query that accesses a set of data having an established first subset accessible by index and an established second subset accessible by sequential scan and not accessible by index, wherein the query is permitted to access the set of data by sequential scan and not be index;
 using a processor to perform a transformation to re-write the query based on the first subset of data being accessible by index and the second subset of data being accessible by sequential scan and not accessible by index which results in a transformed query, wherein the transformed query includes a first query portion corresponding to the first subset that is permitted to access the first subset of data by index and a second query portion corresponding to the second subset that is permitted to access the second subset by sequential scan; and
 optimizing the transformed query such that the first query portion corresponds to a first execution plan and the second query portion corresponds to a second execution plan, wherein the first execution plan is different from the second execution plan.

33. The system of claim 32 in which the query is transformed into the transformed query by taking an original query block and replicating the original query block into the first query portion and the second query portion connected by a union all statement.

34. The system of claim 32 in which the first subset of the data and the second subset of the data are partitions of a partitioned table.

35. The system of claim 32 in which either the first and second execution plans comprise an access path that corresponds to an index access or a sequential scan.

36. The system of claim 32 in which costs analysis is performed to identify an efficient transformation from among a group of candidate query formats.

37. The system of claim 32 in which multiple transformations are applied to generate the transformed query.

38. The system of claim 37 in which the multiple transformations comprise a combination of table expansion, star transformation, or join factorization.

39. A computer-based system for executing a query, comprising:
 a computer processor to execute a set of program code instructions;
 a memory to hold the program code instructions, in which the program code instructions for:
 receiving a transformed query that is intended to access a set of a data having an established first subset accessible by index and an established second subset accessible by sequential scan and not by index, wherein the transformed query is transformed from a query that is permitted to access the set of data by sequential scan and not by index;
 wherein the query is transformed into the transformed query based on the first subset of data being accessible by index and the second subset of data being accessible by sequential scan and not accessible by index, the transformed query including a first query portion corresponding to the established first subset of data that is permitted to access the first subset by index and a second query portion corresponding to the established second subset of the data that is permitted to access the second subset by sequential scan; and wherein the transformed query has been optimized such that the first query portion corresponds to a first execution plan and the second query portion corresponds to a second execution plan; and using a processor to execute the transformed query by using the first execution plan to access the established first subset of data and using the established second execution plan to access the second subset of data.

40. The system of claim 39 in which the first subset of the data and the second subset of the data are partitions of a partitioned table.

41. The system of claim 39 in which either the first and second execution plans comprise an access path that corresponds to an index access or a sequential scan.

42. The system of claim 39 in which the query resulted from multiple transformations that were applied to generate the query.

43. The system of claim 42 in which the multiple transformations comprise a combination of table expansion, star transformation, or join factorization.

* * * * *

UNITED STATES PATENT AND TRADEMARK OFFICE
CERTIFICATE OF CORRECTION

PATENT NO. : 8,903,805 B2  
APPLICATION NO. : 12/860294  
DATED : December 2, 2014  
INVENTOR(S) : Lee et al.

Page 1 of 2

It is certified that error appears in the above-identified patent and that said Letters Patent is hereby corrected as shown below:

Title page, column 2, under Primary Examiner, line 1, delete "Alexy Shmatov" and insert -- Alexey Shmatov --, therefor.

In the Specification

In column 3, line 4, delete "decisions" and insert -- decisions. --, therefor.

In column 4, line 46, after "that" delete "the".

In column 7, line 9, delete "bitvection" and insert -- bit vector --, therefor.

In column 8, line 50, delete "interative" and insert -- iterative --, therefor.

In column 11, line 51, after "the" delete "a".

In column 13, line 38, delete "Si" and insert -- S1 --, therefor.

In the Claims

In column 15, line 12, in Claim 1, after "of" delete "a".

In column 15, line 12, in Claim 1, delete "a" and insert -- an established --, therefor.

In column 15, line 15, in Claim 1, delete "index" and insert -- index, --, therefor.

In column 16, line 12, in Claim 14, delete "a" and insert -- the --, therefor.

In column 16, line 12, in Claim 14, after "of" delete "the".

In column 16, line 14, in Claim 14, after "portion" delete "that".

Signed and Sealed this  
Fourth Day of August, 2015

Michelle K. Lee  
*Director of the United States Patent and Trademark Office*

CERTIFICATE OF CORRECTION (continued)
U.S. Pat. No. 8,903,805 B2

In column 16, line 18, in Claim 14, after "subset" insert -- of the --.

In column 16, line 20, in Claim 14, before "query" insert -- transformed --.

In column 16, line 25, in Claim 14, before "first" insert -- established --.

In column 16, line 26, in Claim 14, before "second" insert -- established --.

In column 16, line 41, in Claim 19, delete "usable" and insert -- readable --, therefor.

In column 16, line 46, in Claim 19, before "data" delete "a".

In column 17, line 24, in Claim 27, delete "usable" and insert -- readable --, therefor.

In column 18, line 9, in Claim 32, delete "be" and insert -- by --, therefor.